United States Patent
Sela et al.

(10) Patent No.: US 10,521,617 B2
(45) Date of Patent: Dec. 31, 2019

(54) NON-VOLATILE MEMORY DEVICE WITH SECURE READ

(71) Applicant: Western Digital Technologies, Inc., San Jose, CA (US)

(72) Inventors: Rotem Sela, Hod Hasharon (IL); Enosh Levi, Kochav Yair (IL)

(73) Assignee: Western Digital Technologies, Inc., San Jose, CA (US)

( * ) Notice: Subject to any disclaimer, the term of this patent is extended or adjusted under 35 U.S.C. 154(b) by 141 days.

(21) Appl. No.: 15/676,708

(22) Filed: Aug. 14, 2017

(65) Prior Publication Data

US 2019/0050602 A1  Feb. 14, 2019

(51) Int. Cl.
| | |
|---|---|
| *G06F 21/00* | (2013.01) |
| *G06F 21/75* | (2013.01) |
| *G06F 21/79* | (2013.01) |
| *G11C 5/00* | (2006.01) |
| *G11C 7/24* | (2006.01) |
| *G11C 16/22* | (2006.01) |
| *G06F 12/02* | (2006.01) |
| *G06F 21/57* | (2013.01) |
| *G11C 29/00* | (2006.01) |
| *G11C 29/04* | (2006.01) |

(52) U.S. Cl.
CPC ............ *G06F 21/75* (2013.01); *G06F 12/02* (2013.01); *G06F 21/575* (2013.01); *G06F 21/79* (2013.01); *G11C 5/005* (2013.01); *G11C 7/24* (2013.01); *G11C 16/22* (2013.01); *G11C 29/76* (2013.01); *G11C 2029/0411* (2013.01)

(58) Field of Classification Search
CPC .......... G06F 21/75; G06F 21/79; G06F 12/02; G11C 7/24; G11C 16/22; G11C 5/005
See application file for complete search history.

(56) References Cited

U.S. PATENT DOCUMENTS

| | | |
|---|---|---|
| 8,254,568 B2 | 8/2012 | Smith et al. |
| 8,291,226 B2 | 10/2012 | Chun et al. |
| 8,356,184 B1 | 1/2013 | Meyer et al. |
| 8,694,767 B2 | 4/2014 | Rodgers et al. |
| 8,745,365 B2 | 6/2014 | Jevans et al. |
| 9,058,491 B1 | 6/2015 | Ahlquist |
| 9,183,390 B2 * | 11/2015 | Thadikaran ............. G06F 21/56 |
| 9,223,511 B2 * | 12/2015 | Rudelic ................. G06F 3/0641 |
| 9,251,381 B1 | 2/2016 | Merry et al. |

(Continued)

*Primary Examiner* — Tri M Tran
(74) *Attorney, Agent, or Firm* — Vierra Magen Marcus LLP

(57) ABSTRACT

Technology that provides security for a requestor of data stored in a non-volatile memory device is disclosed. In one aspect, the non-volatile memory device provides data on a host interface only if a digest for the data matches an expected digest for the data. The non-volatile memory device may store expected digests for data for various logical addresses. Upon receiving a request on the host interface to read data for a logical address, the non-volatile memory device may access the data for the logical address, compute a digest for the accessed data, and compare the computed digest with the expected digest. The non-volatile memory device provides the accessed data on the host interface only if the computed digest matches the expected digest, in one aspect. The non-volatile memory device may be used to provide a secure boot of a host.

18 Claims, 9 Drawing Sheets

(56) References Cited

U.S. PATENT DOCUMENTS

| | | | |
|---|---|---|---|
| 2006/0064759 A1* | 3/2006 | Agranat | G06F 21/10 726/26 |
| 2007/0192610 A1* | 8/2007 | Chun | G06F 21/575 713/176 |
| 2013/0151759 A1* | 6/2013 | Shim | G06F 12/0246 711/103 |
| 2015/0096058 A1* | 4/2015 | Matsukawa | G06F 12/1408 726/29 |
| 2016/0314288 A1 | 10/2016 | Elnekaveh | |
| 2017/0097830 A1 | 4/2017 | Threnberg et al. | |
| 2018/0074722 A1* | 3/2018 | Iwai | G06F 3/0611 |

* cited by examiner

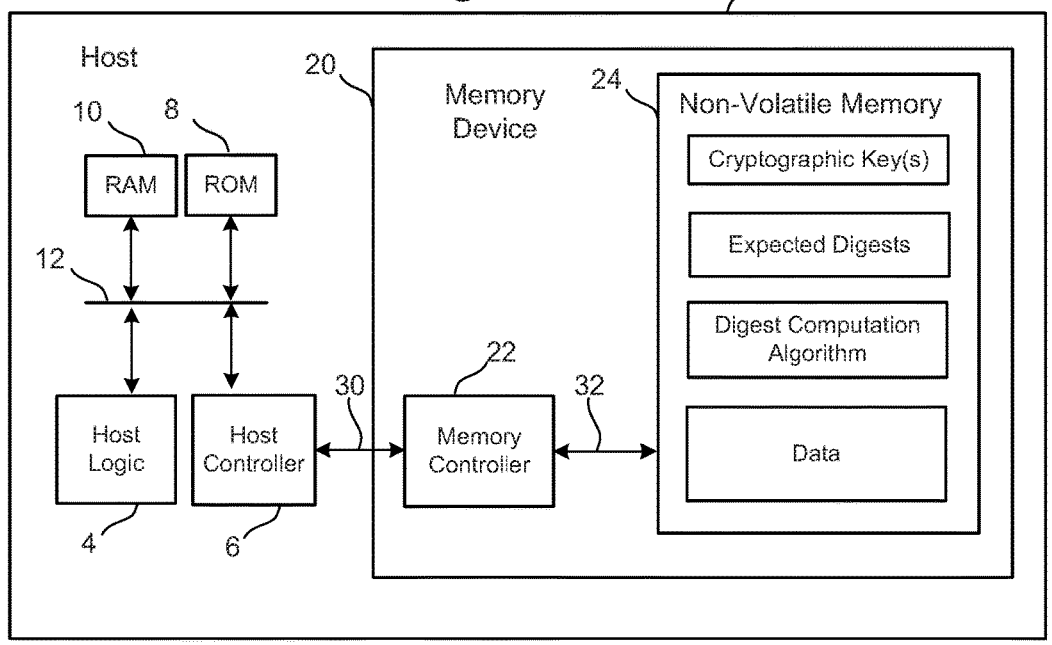
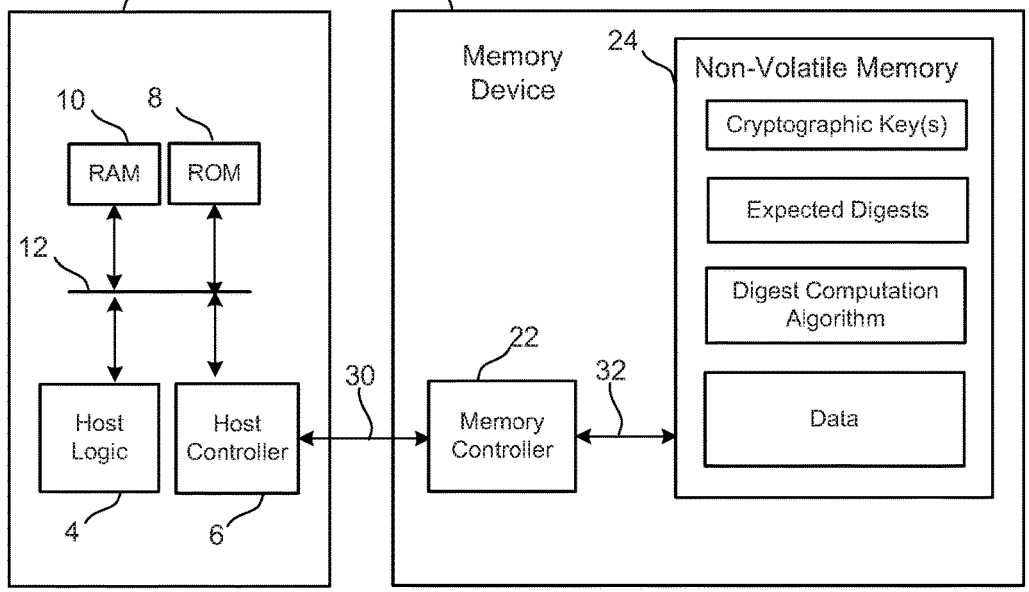

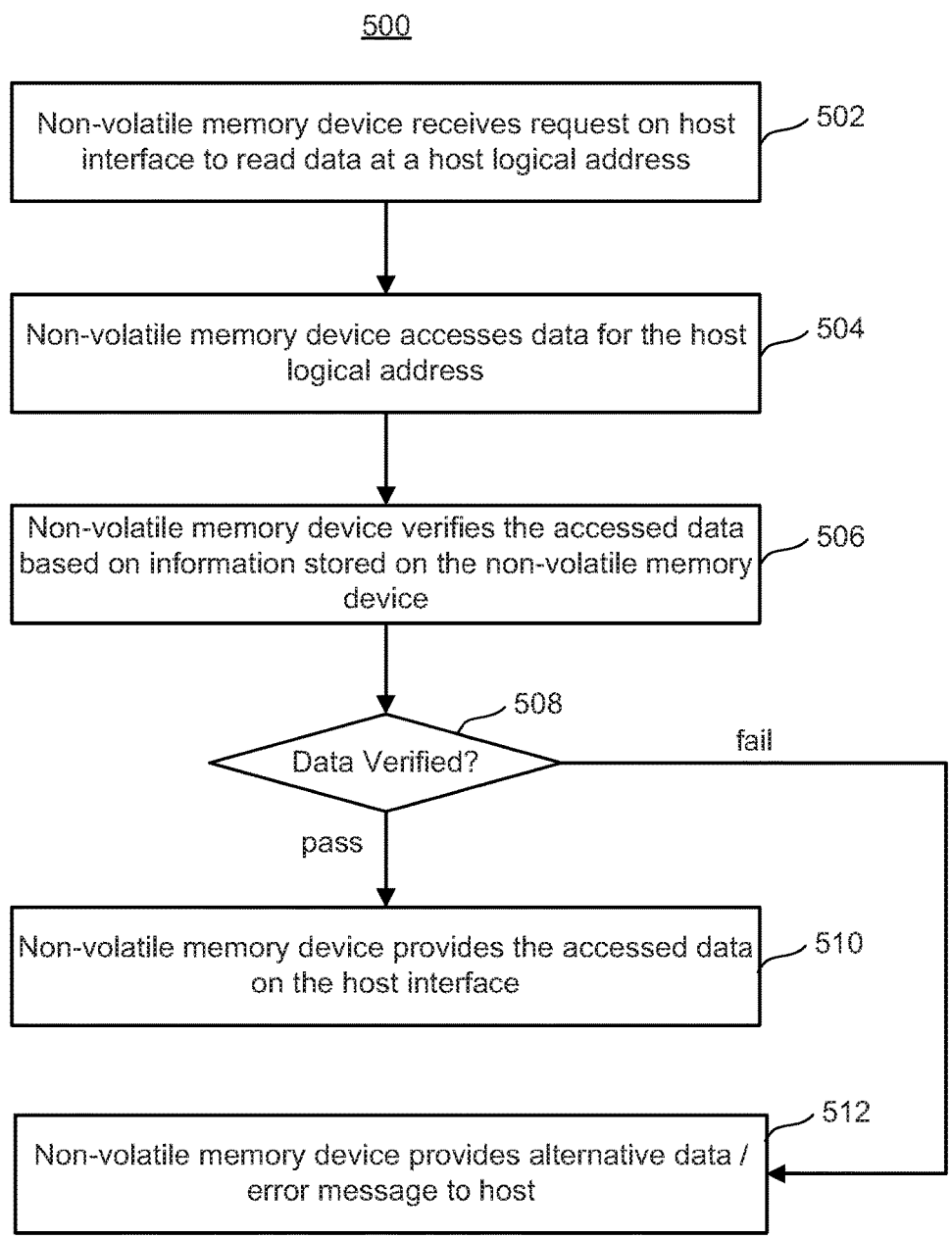

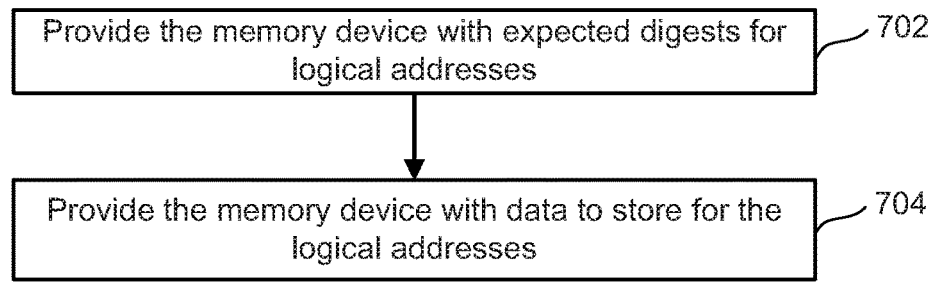
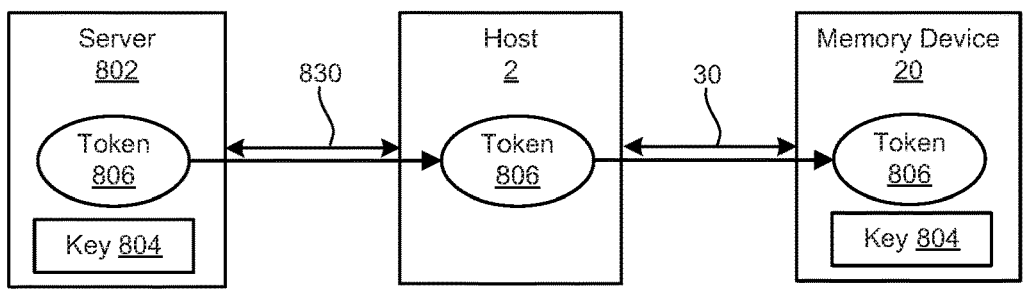
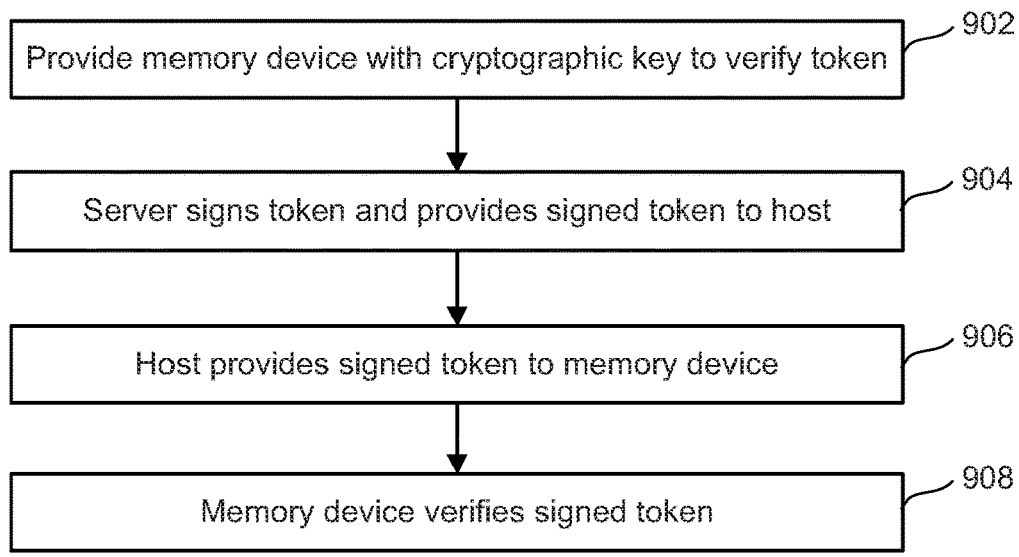

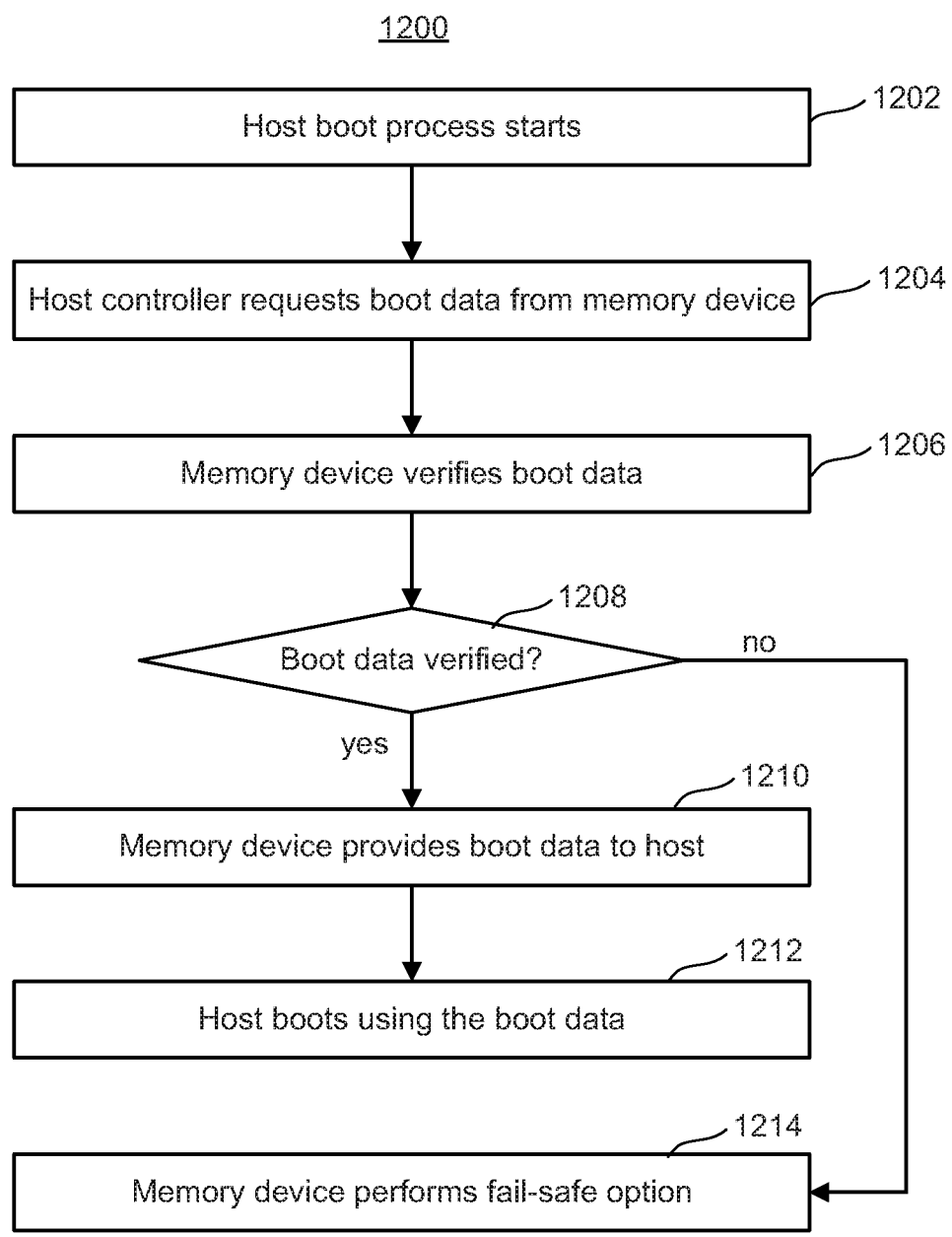

NON-VOLATILE MEMORY DEVICE WITH SECURE READ

BACKGROUND

The present disclosure relates to technology for non-volatile storage.

Semiconductor memory is widely used in various electronic devices such as mobile computing devices, mobile phones, solid-state drives, digital cameras, personal digital assistants, medical electronics, servers, and non-mobile computing devices. Semiconductor memory may include non-volatile memory or volatile memory. A non-volatile memory device allows information to be stored or retained even when the non-volatile memory device is not connected to a power source.

A non-volatile memory device may be used to provide data for a host. Examples of hosts include, but are not limited to, smartphones, personal digital assistants (PDA), laptop computers, notebook computers, set top boxes, cameras, or other electronic device. In some cases, the non-volatile memory device may be embedded within the host. However, in other cases, the non-volatile memory device is not embedded within the host. For example, a USB flash drive is typically not embedded in a host.

It may be desirable for the data (such as, but not limited to, a program) used by an electronic device to be trusted by the electronic device. As one example, the program code that is used to boot a cellular telephone may need to be trusted by the cellular telephone for secure execution. It can be very difficult to be sure the data used by the electronic device is trusted. Many electronic devices, such as cellular telephones, laptop computers, etc., allow software applications to be loaded thereon, thereby presenting challenges in being sure the data used by the electronic device is trusted.

Verifying the integrity of data refers to verifying that the data has not been altered relative to some reference version of the data. For example, there may be a reference version of boot data for a cellular telephone. It is possible for a hacker, or the like, to alter or replace the reference version of the boot data for malicious purposes.

Verifying the authenticity of data refers to verifying that the data is what it purports to be. For example, the aforementioned boot data may originate from a "true" source, such as an entity that manufactured the cellphone. Verifying the authenticity of data can be used to determine whether the data originated from the true source. Note that a data integrity check might or might not pass if the authenticity test fails. For example, a non-authentic copy of software could exactly match a reference version of the software.

As the term is used herein, "trusted data" refers to data for which either the integrity or authenticity has been verified.

BRIEF DESCRIPTION OF THE DRAWINGS

Like-numbered elements refer to common components in the different figures.

FIG. 1A is a block diagram of a memory device embedded in a host device.

FIG. 1B is a block diagram of a memory device connected to a host device.

FIG. 5 is a flowchart of one embodiment of a process of operating non-volatile storage.

FIG. 7 is a flowchart of one embodiment of a process of securely providing a memory device with data and expected digests for the data.

FIG. 8 is a diagram of a server providing a token to a memory device that can be used to verify data.

FIG. 9 is a flowchart of one embodiment of a process a memory device verifying a token from a server.

FIG. 12 is a flowchart of one embodiment of a process of a memory device providing a secure boot as a service to a host.

DETAILED DESCRIPTION

Figure 2:
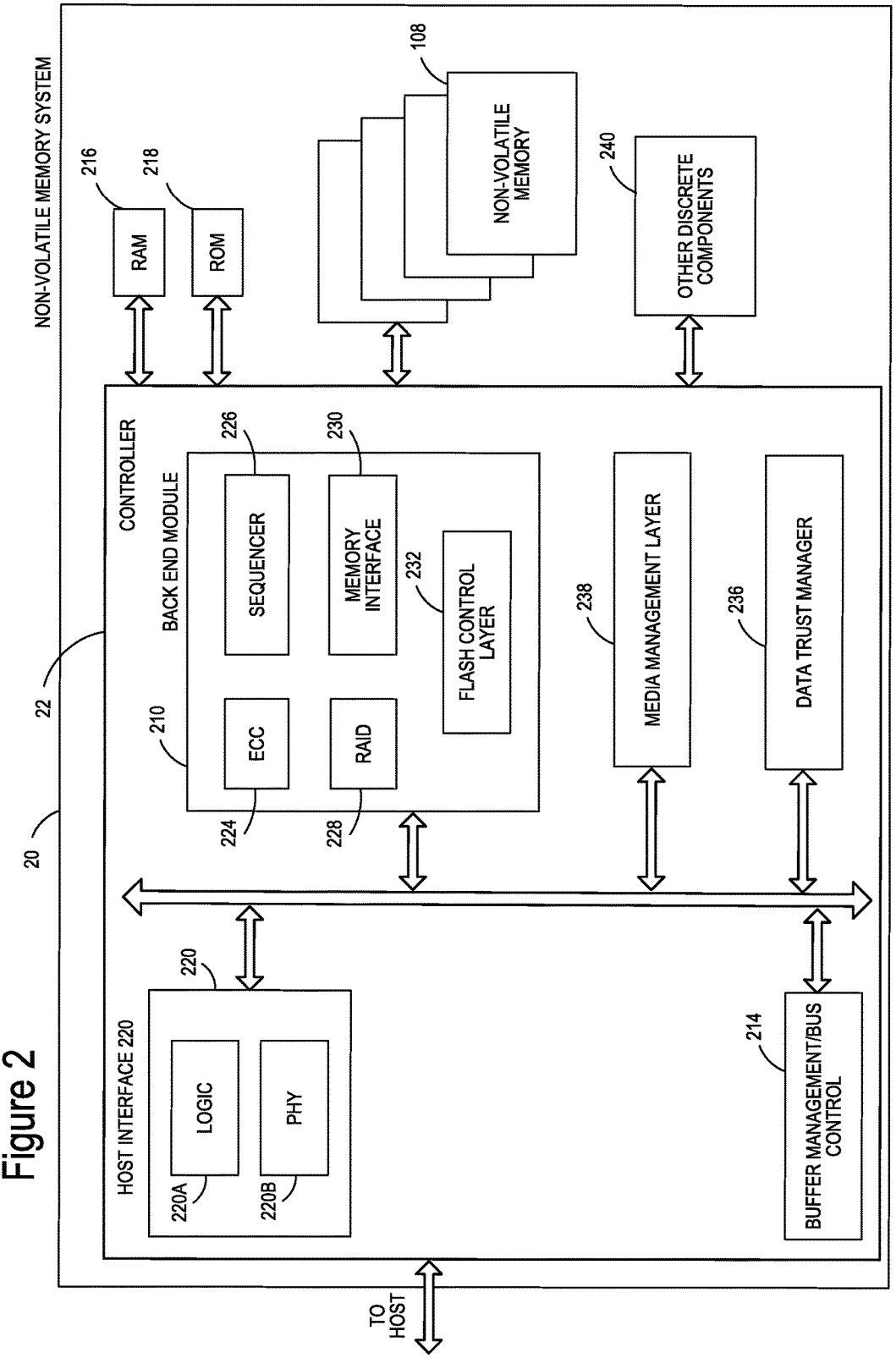
FIG. 2 is a block diagram of one example of a memory device.

Technology is proposed that provides security for a requestor of data stored in a non-volatile memory device. In one embodiment, the non-volatile memory device provides data on a host interface only if a digest for the data matches an expected digest for the data. The non-volatile memory device may store expected digests for data for various logical addresses. Upon receiving a request on the host interface to read data for a logical address, the non-volatile memory device may access the data for the logical address, compute a digest for the accessed data, and compare the computed digest with the expected digest. The non-volatile memory device provides the accessed data on the host interface only if the computed digest matches the expected digest, in one embodiment.

In one embodiment, the non-volatile memory device only provides data on a host interface if the non-volatile memory device verifies the integrity of the data. In one embodiment, the non-volatile memory device provides data on a host interface only if the non-volatile memory device verifies the authenticity of the data. In one embodiment, the non-volatile memory device provides data on a host interface only if the non-volatile memory device verifies that the data is trusted by a host that requested the data. In one embodiment, the non-volatile memory device provides data on a host interface only if the non-volatile memory device verifies both the integrity and authenticity of the data. Thus, the non-volatile memory device may prevent data from leaving the memory device unless a condition (or conditions) such as data integrity and/or data authenticity is/are met.

The process of a host starting operation and entering a state of readiness for intended operation is called "booting" or a "boot process." The non-volatile memory device may be used to provide a secure boot of a host. For example, when the host is booting, the host may send a request to the non-volatile memory device for boot data. The boot data can include code as well as reference information (e.g., fields, integers, floating point numbers, characters, words, pointers, etc.). The host may specify a logical address (or various logical addresses) for the boot data. The non-volatile memory device may access data stored on the non-volatile memory device for the logical address(es). The non-volatile memory device may determine whether the accessed data (e.g., boot data) for the logical address(es) is trusted by the host by, for example, matching computed digests for the accessed data with expected digests for the data. The non-volatile memory device provides the data (e.g., boot data) to the host on the host interface only if the non-volatile memory device determines that the data is trusted by the host, in one embodiment. Note that it may be much harder to hack the non-volatile memory device than to hack the host because the host may allow software applications to be loaded therein. However, the non-volatile memory device may typically not allow software applications to be loaded therein. Thus, the non-volatile memory device verifying the data (e.g., boot data) can be much more secure than the host verifying the data (e.g., boot data).

FIGS. 1A and 1B are two alternative environments in which embodiments disclosed herein may be practiced. In the environment of FIG. 1A, the memory device 20 is embedded within a host device 2. In the environment of FIG. 1B, the memory device 20 is not embedded within the host device 2.

Each environment has a memory device 20 connected to a host 2 through a host connection 30. The host connection 30 represents a path that permits signals to transfer information (e.g., data, commands, etc.) between the memory controller 22 and the host controller 6. The connection 30 could include a physical connection (e.g., electrically conductive wires or traces, optical waveguides, etc.) or be wireless. The signals could be transmitted via electrical voltage, electrical current, optical signal, electromagnetic radiation, etc. Note that the memory controller 22 and host controller 6 may each contain logic thereon to control the transfer of signals over the host connection 30. Such logic may also generate the signals to be transmitted over the host connection 30 and receive and decode the signals received over the host connection 30.

FIG. 1A depicts a block diagram depicting one embodiment of a non-volatile memory device 20 embedded in a host device 2 that implements embodiments of technology described herein. In one embodiment, memory device 20 is an embedded multi-media card (eMMC) memory device and the memory device has a multi-media card (MMC) interface. In one embodiment, memory device 20 is a solid state drive (SSD). Host device 2 includes host logic 4 for performing the intended functions of host 2. For example, host 2 can be a smartphone, personal digital assistant (PDA), laptop computer, notebook computer, set top box, camera, or other electronic device. Host logic 4 performs the functions of a smartphone, PDA, laptop computer, notebook computer, set top box, camera, etc. Host logic 4 may include an application processor. ROM 8 and/or non-volatile memory 24 may store software applications to run on the application processor. RAM 10 may be used to temporality store data and/or code while executing software applications. RAM 10 could be DRAM, SRAM, etc.

Host logic 4 is connected to host controller 6 for communicating with memory device 20 via host connection 30. Host connection 30 may comply with a variety of formats including, but not limited to, multi-media card (MMC), Universal Flash Storage (UFS), non-volatile memory express (NVMe), and Peripheral Component Interconnect Express (PCIe). Both the host controller 6 and the memory controller 22 may contain logic for communicating over the host connection 30. Thus, host controller 6 and memory controller 22 may contain logic to comply with, for example, MMC, UFS, NVMe, or PCIe.

Host controller 6 is also in communication with ROM 8 and RAM 10 through bus 12. In one embodiment, ROM 8 stores code to start the boot process for host 2. When host 2 is turned on or restarted (or is otherwise restarting the boot process), host controller 6 accesses code in ROM 8 to start the boot process. That code will instruct host controller 6 to read the boot data from embedded memory device 20. In one embodiment, the code will inform the host controller 6 at which logical address and/or logical unit number (LUN) the boot data is stored. The boot data, which can include code as well as reference information (e.g., fields, integers, floating point numbers, characters, words, pointers, etc.), will be used by the host to perform a boot process. The memory device 20 provides a secure boot for the host 2, in one embodiment. For example, rather than have the root of trust for the host boot being located on the host (here host refers to logic external to the memory device 20), the root of trust is located on the memory device 20, in some embodiments.

Memory device 20 includes memory controller 22 in communication with non-volatile memory 24. Note that FIG. 1A shows a logical depiction of non-volatile memory 24. In one embodiment, non-volatile memory 24 can be implemented using one or multiple memory die. Interface 32 between memory controller 22 and non-volatile memory 24 may be any suitable interface. In one embodiment, the non-volatile memory 24 is a NAND memory and interface 32 is compliant with a version of the Open NAND Flash Interface (ONFI). However, non-volatile memory 24 is not limited to NAND. Non-volatile memory 24 is NOR in one embodiment. Non-volatile memory 24 is resistive random-access memory (ReRAM), in one embodiment. Non-volatile memory 24 is magnetic storage (such as a hard disk drive), in one embodiment. Non-volatile memory 24 could be another type of memory. In one embodiment, non-volatile memory 24 includes a two-dimensional array of non-volatile memory cells. In one embodiment, non-volatile memory 24 includes a three-dimensional array of non-volatile memory cells.

In one embodiment, the host has a host logical address space. When the host 2 sends requests over the host connection 30 to write or read data to/from the non-volatile memory 24, the host may specify a logical address. The memory controller 22 may translate the logical address to a physical address within the non-volatile memory 24, and send a command to the non-volatile memory 24 to write or read data to/from that physical address.

Non-volatile memory 24 has stored therein one or more cryptographic key(s), expected digests, a digest computation algorithm, and data, in this example. In one embodiment, the one or more cryptographic key(s) contain a shared secret between the memory device 20 and a trusted entity. In one embodiment, the trusted entity is some entity other than the host 2, such as a secure server (note that the host 2 in this context excludes the memory device 20). In one embodiment, the trusted entity is a secure environment (SE) on the host. The trusted entity may be a trusted source of data to be accessed from non-volatile memory 24. The expected digests may include a list of logical addresses (e.g., logical block addresses, Logical Unit Number, etc. . . . ) and an expected digest for data stored in the non-volatile memory 24 for each logical address. The digest computation algorithm may be used to compute a digest for the data stored in the non-volatile memory 24. The digest computation algorithm is a cryptographic hash function (e.g., message digest algorithm), in one embodiment. Examples of the digest computation algorithm include, but are not limited to, SHA-1, SHA-2, MD2, MD4, MD5, MD6. In this context, SHA refers to "Secure Hash Algorithm" and MD refers to "Message Digest".

The cryptographic key(s) and expected digests are stored in a secure portion of the memory device, in one embodiment. The cryptographic key(s) and expected digests are stored such that they cannot be modified or altered using standard write commands, in one embodiment. The cryptographic key(s), expected digests, and/or digest computation algorithm could be stored in non-volatile memory cells in non-volatile memory 24, but could be stored elsewhere on the memory device 20. In one embodiment, the cryptographic key(s) is/are stored in ROM in the memory controller 22. In one embodiment, the digest computation algorithm is stored in ROM in the memory controller 22. The data is typically stored in non-volatile memory cells in non-volatile memory 24.

In one embodiment, when the host 2 sends a request to read data at a logical address, the memory controller 22 converts the logical address to a physical address and sends a command to the non-volatile memory 24 to read the data stored at that physical address. The non-volatile memory 24 may provide the data at that physical address to the memory controller 22. If the non-volatile memory 24 stores the expected digest, the non-volatile memory 24 also sends the expected digest for the logical address to the memory controller 22. The memory controller 22 may compute a digest for the accessed data and compare the computed digest with the expected digest. Only if the computed digest and expected digest match, will the memory controller 22 provide the data for the logical address on the host interface 220 to the host controller 6, in one embodiment. In one embodiment, this results in only trusted data being provided from memory device 20 to the host controller 6. In one embodiment, this results in data for which both integrity and authenticity has been verified being provided from memory device 20 to the host controller 6. Thus, the memory device 20 may provide a secure read for the host 2.

The data stored in the non-volatile memory 24 could be any data. As one example, the data may include boot data for the host 2. The cryptographic key(s), expected digests, digest computation algorithm, and/or data may be stored on the memory device 20 when the memory device is manufactured. However, the cryptographic key(s), expected digests, digest computation algorithm, and/or data can be provided (or updated) via host connection 30 in the field. For example, the data and expected digests can be provided in the field as a way to provide software updates for the host 2. For example, a secure server could send code updates to the host 2. The host could instruct the memory device 20 to store the code updates as data in the non-volatile memory 24. In one embodiment, the server also securely sends expected digests for the code updates to be stored on the memory device 20. In another embodiment, a secure entity at the host (e.g., Secure Environment (SE)) securely sends expected digests for the code updates to be stored on the memory device 20. Thus, the memory device 20 can later use the expected digests to verify integrity and/or authenticity of the code updates, in response to the host requesting that the memory device 20 provide the code updates to the host. Further details are discussed below.

It is not required that the memory device 20 be embedded within the host 2. FIG. 1B depicts an environment in which the memory device 20 is not embedded within the host 2. The memory device 20 may be, for example, a USB flash drive, Memory Stick, Secure Digital (SD) memory card, UFS Card, MMC, CompactFlash (CF) storage device. The memory device 20 may be connected to the host 2 by either a wireline or wireless connection. Thus, host connection 30 may be a wireless or wired interface. The host connection 30 may be, for example, a Universal Serial Bus (USB) interface, Bluetooth interface, Small Computer Systems Interface (SCSI), etc. In some cases, the host connection 30 of memory device 20 may be temporality inserted into the host 2 by, for example, a port (such as a USB port). In some cases, the host 2 may have a card reader into which the host connection 30 may be inserted/removed.

FIG. 2 is a block diagram of one example of a memory device 20. However, the architecture depicted in FIG. 2 can also be used to implement other types of non-volatile memory devices. Memory device 20 includes a controller 22 connected to one or more non-volatile memory die 108 (which comprise the non-volatile memory 24 depicted in FIG. 1A or 1B). As used herein, for a system that uses non-volatile memory, a controller is a device that manages data stored on the non-volatile memory and communicates with a host. Controller 22 can have various functionality in addition to the specific functionality described herein. For example, controller 22 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. In operation, when a host needs to read data from or write data to the non-volatile memory, it will communicate with controller 22. If the host provides a logical address to which data is to be read/written, controller 22 converts the logical address received from the host to a physical address in the physical flash memory. Alternatively, the host can provide the physical address. Controller 22 can also perform various memory management functions, such as, but not limited to, wear leveling (distributing write operations among memory die or blocks of the memory die to avoid wearing out specific blocks of memory that would otherwise be repeatedly written to) and garbage collection (after a block is full, moving only the valid pages of data to a new block, so the full block can be erased and reused).

In some embodiments, memory device 20 includes a single channel between controller 22 and non-volatile memory die 108; however, the subject matter described herein is not limited to having a single memory channel. For example, in some memory system architectures 2, 4, 8 or more channels may exist between controller 22 and memory die 108, depending on controller capabilities. In any of the embodiments described herein, more than a single channel may exist between controller 22 and memory die 108, even if a single channel is shown in the drawings.

As depicted in FIG. 2, controller 22 includes a host interface 220 that interfaces with a host, a back end module 210 that interfaces with the one or more non-volatile memory die 108, and various other modules that perform functions which will now be described.

The components of controller 22 depicted in FIG. 2 may take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., memory) to program a processor to perform the functions described herein.

Referring again to modules of the controller 22, a buffer manager/bus control 214 manages random access memory (RAM) 216 and controls the internal bus arbitration of controller 22. A read only memory (ROM) 218 stores boot code for the controller. Although illustrated in FIG. 2 as located separately from the controller 22, in other embodiments one or both of the RAM 216 and ROM 218 may be located within the controller. In yet other embodiments, portions of RAM and ROM may be located both within the controller 22 and outside the controller. Further, in some implementations, controller 22, RAM 216, and ROM 218 may be located on separate semiconductor die.

Host interface 220 includes logic 220A and a physical layer interface (PHY) 220B. The PHY 220B may provide the electrical interface with the host or next level storage controller. The logic 220A may be configured to facilitate transfer for data, control signals, and timing signals. The choice of the type of host interface 220 can depend on the type of memory being used. Examples of host interfaces 220 include, but are not limited to, SATA, SATA Express, SAS, Fibre Channel, USB, M-PHY, UniPro, UFS, PCIe, MMC and NVMe. In one embodiment, host interface 220 provides the single communication interface adapted to communicate with an external computing device for the controller 22 and memory die 108 of memory device 20.

Back end module 210 includes an error correction code (ECC) engine 224 that encodes the data bytes received from the host, and decodes and error corrects the data bytes read from the non-volatile memory die 108. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. A flash control layer 232 controls the overall operation of back end module 210.

Additional components of memory device 20 illustrated in FIG. 2 include media management layer 238, which performs wear leveling of memory cells of non-volatile memory die 108. System 100 also includes other discrete components 240, such as external electrical interfaces, external RAM, resistors, capacitors, or other components that may interface with controller 22. In alternative embodiments, one or more of the physical layer interface 222, RAID module 228, media management layer 238 and buffer management/bus controller 214 are optional components that are not necessary in the controller 22.

The Flash Translation Layer (FTL) or Media Management Layer (MML) 238 may be integrated as part of the flash management that may handle flash errors and interfacing with the host. In particular, MML is responsible for the internals of non-volatile memory management. In particular, the MML 238 may include an algorithm in the memory device firmware which translates writes from the host into writes to the memory of a memory die 108. The MML 238 may be needed because: 1) the memory may have limited endurance; 2) the memory may only be written in multiples of pages; and/or 3) the memory may not be written unless it is erased as a block. The MML 238 understands these potential limitations of the memory which may not be visible to the host. Accordingly, the MML 238 attempts to translate the writes from host into writes into the flash memory 126. As described below, erratic bits may be identified and recorded using the MML 238. This recording of erratic bits can be used for evaluating the health of blocks and/or word lines (the memory cells on the word lines).

Controller 22 also includes data trust manager 236, which can be hardware only (e.g., electrical circuit) or software running on a processor. Data trust manager 236 manages the verification of integrity and authenticity of at least some of the data stored in the non-volatile memory 108, in one embodiment. Data trust manager 236 may determine whether data stored in the non-volatile memory 108 is trusted by the host. Data trust manager 236 may perform the process described below with respect to FIG. 6, as well as steps 506-512 of FIG. 5, step 908 of FIG. 9, and/or steps 1006-1010 and 1014 of FIG. 10.

Note that although the controller 22 in FIG. 2 is described as controlling flash memory, more generally the controller 22 is not limited to controlling flash memory. The controller 22 could be configured to manage operations in ReRAM memory, magnetoresistive memory (e.g., MRAM), phase change memory (e.g., PCRAM), or other types of memory.

Figure 3:
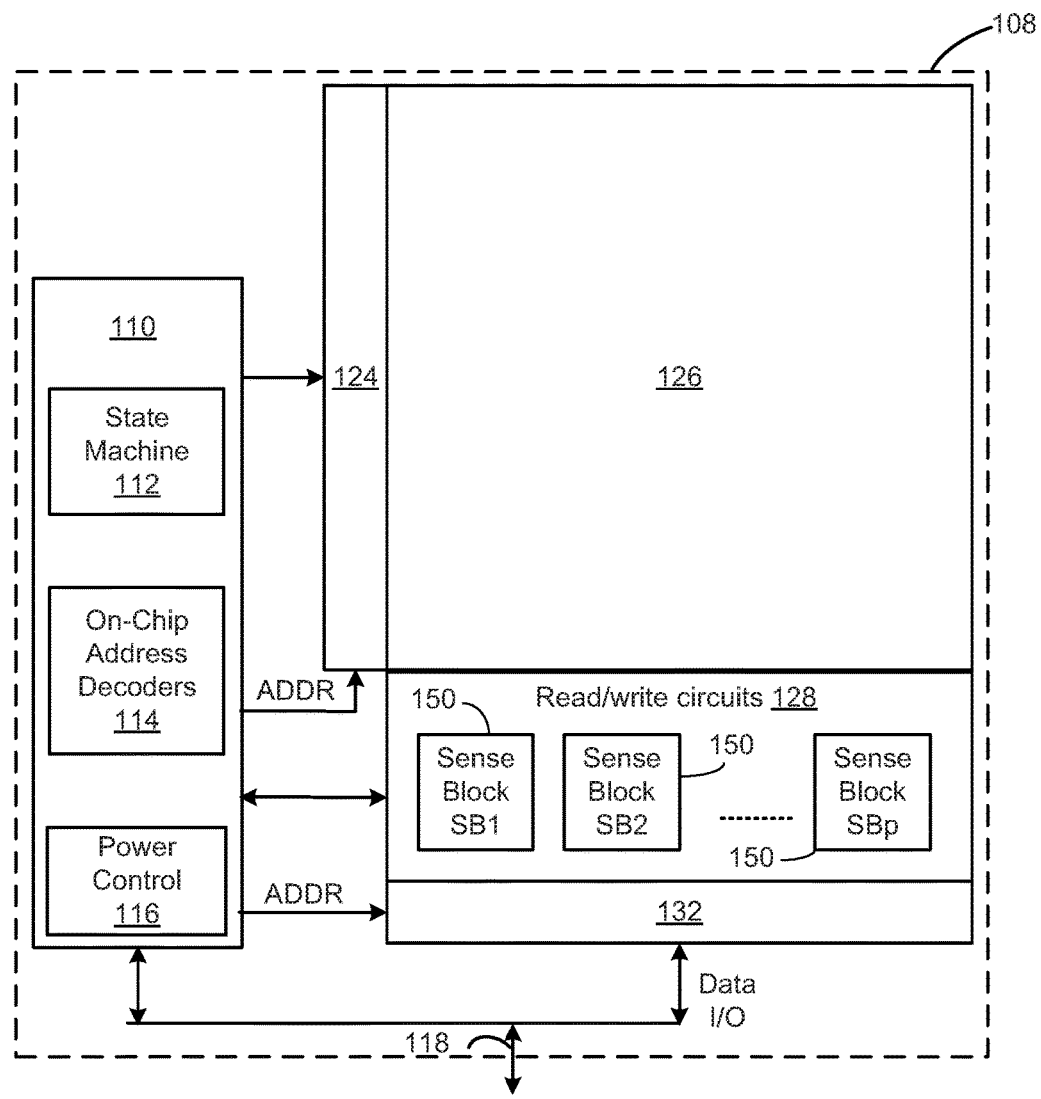
FIG. 3 is a block diagram of a non-volatile memory die.

FIG. 3 is a functional block diagram of an example memory die 108. The components depicted in FIG. 3 are electrical circuits. In one embodiment, memory die 108 includes a monolithic three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. Commands and data are transferred between controller 22 and memory die 108 via signal lines 118. In one embodiment, memory die 108 includes a set of input and/or output (I/O) pins that connect to lines 118.

One embodiment of memory structure 126 comprises a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. In one embodiment, memory structure 126 implements three dimensional NAND flash memory. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters. On-chip address decoder 114 provides an address interface between addresses used by host 140 or controller 22 to the hardware address used by the decoders 124 and 132. Power control module 116 controls the power and voltages supplied to the word lines and bit lines during memory operations. It can include drivers for word lines, selection transistors, source lines, and other components. Power control module 116 may include charge pumps for creating voltages. The sense blocks 150 include bit line drivers.

Any one or any combination of control circuitry 110, state machine 112, decoders 114/124/132, power control module 116, sense blocks 150, read/write circuits 128, data trust manager 236, and controller 22 can be considered one or more control circuits that performs the functions described herein.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within memory structure 126. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration.

One example memory system is a three dimensional memory structure that includes vertical NAND strings with charge-trapping material. Other (2D and 3D) memory structures can also be used with the technology described herein. For example, floating gate memories (e.g., NAND-type and NOR-type flash memory), ReRAM cross-point memories, magnetoresistive memory (e.g., MRAM), and phase change memory (e.g., PCRAM) can also be used.

One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figures 4A, 4B:
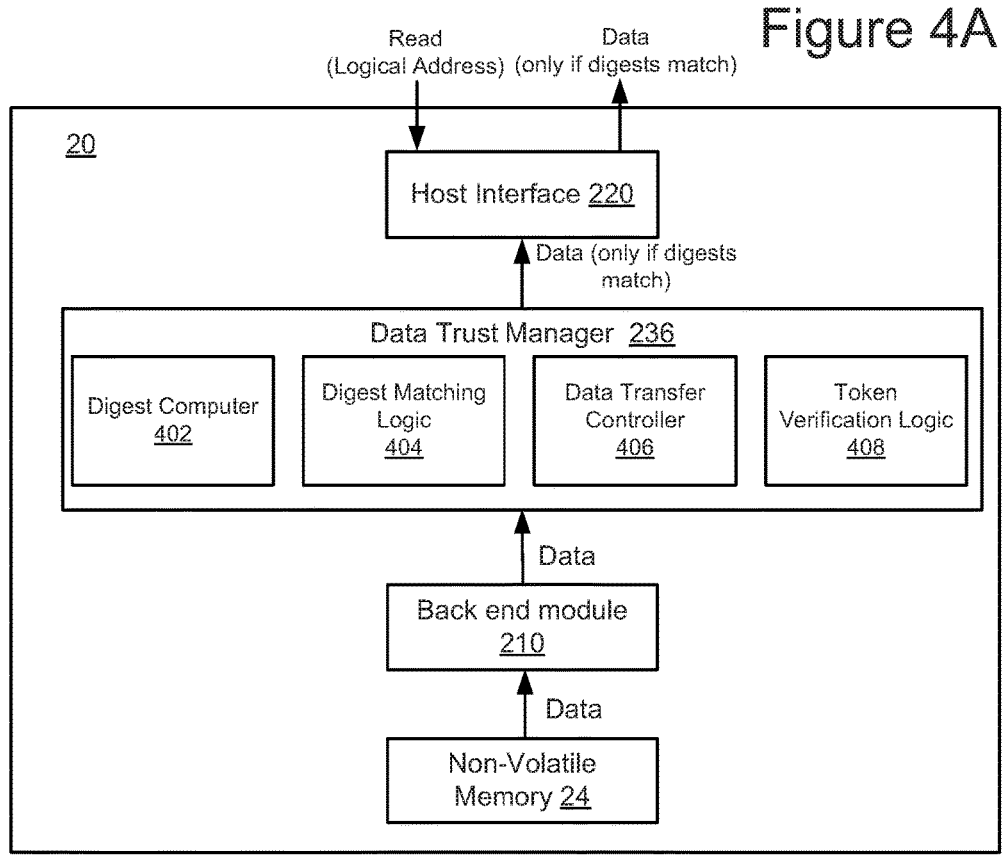
FIG. 4A is a block diagram of one embodiment of a memory device.
FIG. 4B depicts an example list of pairs of logical addresses and expected digests for the logical address.

FIG. 4A is a block diagram of one embodiment of a memory device 20. The memory device 20 could be embedded in a host, as in the example of FIG. 1A. The memory device 20 is not required to be embedded in a host, as in the example of FIG. 1B. FIG. 4A depicts further elements of one embodiment of data trust manager 236. The data trust manager 236 has a digest computer 402, digest matching logic 404, data transfer controller 406, and token verification logic 408.

The host interface 220 may receive requests to read data stored in the non-volatile memory 24. These requests may come from the host 2 (not depicted in FIG. 4A). The read requests may specify a logical address, such as a logical block address (LBA). The logical address may be in an address space of the host. The back end module 210 may access the data for the logical address from the non-volatile memory 24, and provide that data to the data trust manager 236.

The digest computer 402 is configured to compute a digest for the data that was accessed from non-volatile memory 24, in one embodiment. In one embodiment, the digest computer 402 accesses a digest computation algorithm stored on the memory device to compute the digest. In one embodiment, the digest computation algorithm is a hash function that is applied to the data being authenticated. The memory device 20 may also store a cryptographic key, which may be used with the digest computation algorithm to compute the digest. The cryptographic key may be a shared secret with an entity that is a trusted source of the data being verified.

The digest matching logic 404 is configured to determine whether the computed digest matches an expected digest for data for the logical address (or a set of addresses). In one embodiment, digest matching logic 404 accesses a list of expected digests stored on the memory device 20. FIG. 4B depicts an example list 450 of pairs of logical addresses and expected digests for the logical address. For example, the list 450 contains Expected Digest 1 for LBA 1, Expected Digest 2 for LBA 2, etc. The logical address may be specified by other than a block address. An Expected Digest may also specify a range or a set of address. In one embodiment, the memory device 20 stores the list 450 in non-volatile storage. The list 450 may be stored anywhere on the memory device 20 including, but not limited to, non-volatile memory 24, memory die 108 (as well as temporarily in RAM 216). The list 450 may be stored on the memory device 20 when the memory device 20 is configured for the first time. The list 450 may be updated (or stored for the first time) in the field. FIG. 9 shows one embodiment of providing a token that contains the list 450 to the memory device 20 in the field. The token verification logic 408 is configured to verify the integrity and/or authenticity of the token, as a condition for the data trust manager 236 to use the list 450 to verify data.

The data transfer controller 406 is configured to restrict access to the data, based on whether the data is verified for integrity and/or authenticity, in one embodiment. The data transfer controller 406 may restrict access depending on whether the computed data digest matched the expected data digest. In one embodiment, the data transfer controller 406 only provides the data to the host interface 220 upon the condition that the data is verified for integrity and/or authenticity. Thus, the host interface 220 will only provide the data to host upon the condition that the data is verified for integrity and/or authenticity, in one embodiment. Stated another way, the data is only provided to the host if the host trusts the data, in one embodiment. Note that the host interface 220 provides an external interface to the memory device 20, in one embodiment. Thus, the data is prevented from leaving the memory device 20 unless it is verified for integrity and/or authenticity, in one embodiment. This provides for a very secure technological solution, as the memory device 20 may be very difficult to hack. In some embodiments, the memory device 20 does not permit software applications to be loaded therein, as a host might allow. Note that were the host to verify the data for integrity and/or authenticity, malicious software on the host might prevent the proper verification of the data. For at least this reason, the memory device 20 may be much more secure than the host.

The components of data trust manager 236 may take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., memory) to program a processor to perform the functions described herein.

FIG. 5 is a flowchart of one embodiment of a process 500 of controlling access to data in non-volatile storage. The process 500 may be used to verify integrity and/or authenticity of data that is requested by a host. The process 500 may be performed within a non-volatile memory device 20 such as those in FIG. 1A, 1B, 2 or 4. The process 500 may be performed in response to a request for data from a host controller 6. Prior to performing process 500, certain information may have been stored on the non-volatile memory device 20. This information may include a list of expected digests for data that is stored on the non-volatile memory device 20. The list may contain pairs of logical addresses and the expected digest for the data for that logical address. This information could also include one or more cryptographic keys, as well as a digest computation algorithm. Thus, this information may be used to verify integrity and/or authenticity of the data.

Step 502 includes the non-volatile memory device 20 receiving a request on the host interface 220 to read data for some host logical address. In one embodiment, the request is received on host interface 220. The request may have been transmitted over host connection 30 from, for example, host controller 6.

Step 504 includes the non-volatile memory device 20 accessing data for the host logical address from non-volatile memory 24. In one embodiment, controller 22 translates the host logical address to a physical address in non-volatile memory 24. In one embodiment, back end module 210 sends a command to non-volatile memory 24 to access the data at the physical address. Note the step 504 may include performing error correction on the data. For example, ECC engine 224 may be used to decode and error correct the data read from the non-volatile memory 24. Thus, if some of the bits in the data flipped as a result of, for example, charge loss on a memory cell, such flipped bits can be corrected in step 504.

Step 506 includes the non-volatile memory device 20 verifying the accessed data. Note that step 506 may be performed after error correction has been performed on the data. Step 506 may include verifying the integrity and/or authenticity of the accessed data. In one embodiment, step 506 verifies for data integrity, but does not verify for data authenticity. In one embodiment, step 506 verifies for data authenticity, but does not verify for data integrity. In one embodiment, step 506 verifies for both data integrity and data authenticity. Step 506 may include determining whether the accessed data is trusted by the host. In one embodiment, the memory controller 22 computes a digest for the accessed data and compares the computed digest with an expected digest for the data. In one embodiment, memory controller 22 uses a cryptographic hash function and a cryptographic key to generate the digest. Further details of one embodiment of step 506 are described in connection with FIG. 6.

Step 508 includes determining what step to take responsive to whether the data passed or failed the verification of step 506. In one embodiment, if step 506 tested for both data integrity and data authenticity, then both data integrity and data authenticity must be successfully verified for the verification to pass. In one embodiment, if step 506 tested for data integrity but not data authenticity, then only data integrity need be successfully verified for the verification to pass. In one embodiment, if step 506 tested for data authenticity but not data integrity, then only data authenticity need be successfully verified for the verification to pass. As defined herein, if both data integrity and data authenticity are successfully verified, then the data are considered to be trusted by the host.

If the data is determined to have been verified (step 508=pass), then the non-volatile memory device 20 provides the data on the host interface 220, in step 510.

However, if the data is not verified (step 508=fail), then the non-volatile memory device 20 does not provide the data on the host interface 220. Thus, the non-volatile memory device does not allow the data to leave the non-volatile memory device. Moreover, the data will not be provided over the host connection 30. Hence, the host 2 will not receive the data if the data is not verified. In one embodiment, the host will not be provided with data that the host does not trust.

Step 512 includes various options in the event that the data is not verified. One option is to provide alternative data to the host 2. For example, if the data was boot data, then the non-volatile memory device 20 might provide alternative boot data that is known to be trusted by the host. Another option is to provide an error message to the host without providing any data on the host interface 220.

Figure 6:
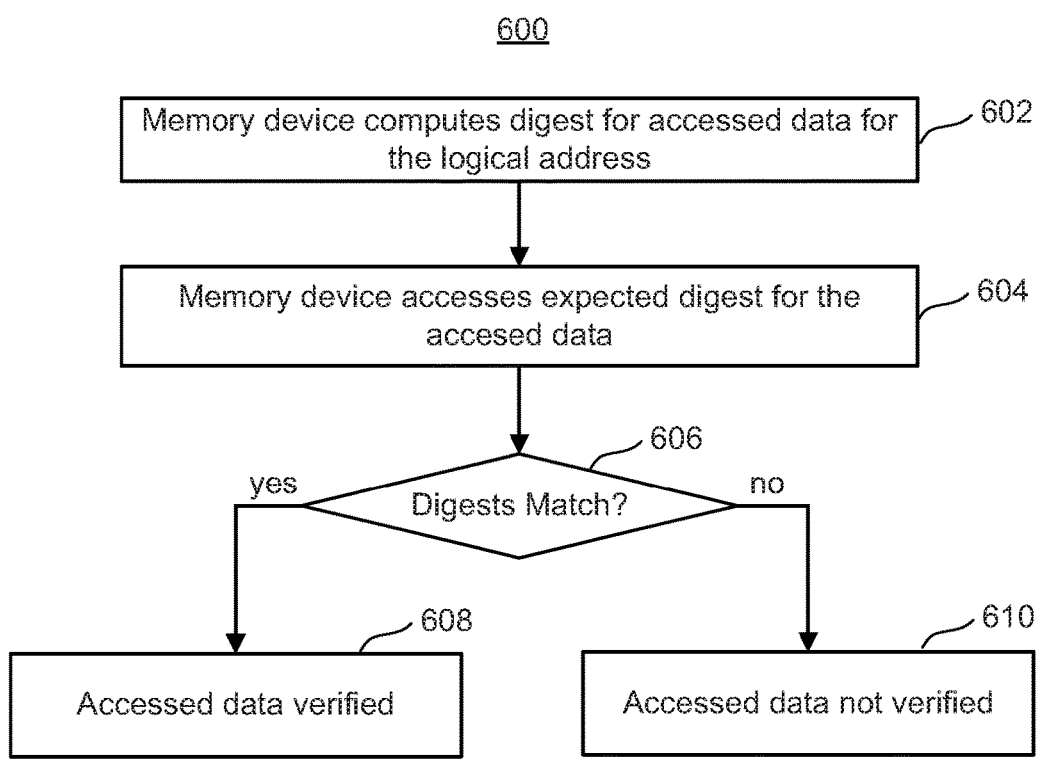
FIG. 6 is one embodiment of a process of verifying data accessed from non-volatile memory.

FIG. 6 is one embodiment of a process 600 of verifying data for integrity and/or authenticity. Process 600 may be performed within controller 22. Process 600 is performed by data trust manager 236, in one embodiment. Process 600 is one embodiment of step 506 of process 500.

Step 602 includes the memory device 20 computing a digest for data that was accessed from non-volatile memory 24 for the logical address. In one embodiment, data trust manager 236 uses a digest computation algorithm to compute the digest. The digest computation algorithm is a cryptographic hash function (e.g., message digest algorithm), in one embodiment. Examples of the digest computation algorithm include, but are not limited to, SHA-1, SHA-2, MD2, MD4, MD5, MD6. The data trust manager 236 may also use a secret cryptography key. The secret cryptography key is a shared secret with a trusted source of the data being verified, in one embodiment. For example, the trusted source could be the manufacturer of a cellphone that hosts the memory device 20. In one embodiment, the computed digest is a keyed-hash message authentication code (HMAC).

Step 604 includes the memory device 20 accessing an expected digest for the data that was accessed for the logical address. In one embodiment, data trust manager 236 accesses a list 450 of LBAs and associated expected digests. Note that the list 450 may be securely stored on the memory device 20.

Step 606 includes a determination of whether the computed digest matches the expected digest. If there is a match, then the data is determined to be verified (step 608). If there is not a match, then the data is determined to not be verified (step 610). Depending on the outcome of process 600, either step 510 or 512 of process 500 may be performed.

FIG. 7 is a flowchart of one embodiment of a process 700 of securely providing a memory device 20 with data and expected digests for the data. Process 700 could be performed when the memory device is manufactured or in the field. If performed at manufacture, a configuration tool may be used to provide the data and expected digests to the memory device. If performed in the field, a secure server (for example, server 802, FIG. 8) or a secure element in the host side (e.g., SE) might provide the data and expected digests. The data and expected digests might pass through the host, but this is not required. In one embodiment, process 700 is performed prior to process 500, such that the memory device 20 has the data and expected digests. The steps of process 700 could be reversed. In one embodiment the expected digests will be passed through RPMB (Replay Protected Memory Block) protocol.

Step 702 includes providing the memory device 20 with expected digests for logical addresses. In one embodiment, a list 450 such as in FIG. 4B is provided to the memory device. Thus, there might be one expected digest for each LBA. Each LBA could be for some fixed size of data such as 4 KB, as one example. The data is not, however, required to be of some fixed size. In one embodiment, the list 450 is stored into a secure region of the memory device 20 at manufacture. In one embodiment, the list 450 is provided to the memory device 20 in the field by a secure channel with a server. A secure channel, as is known in the field of cryptography, is a way of transferring data that is resistant to overhearing and tampering.

Step 704 includes providing the memory device 20 with data to be stored for the logical addresses. For example, the host might send the memory device 20 a block of data for each LBA on the list 450. Note that host could send the data to the memory device 20 prior to the list 450 even being constructed. Typically, the memory device 20 will store the data in non-volatile memory 24.

FIG. 8 is a diagram of a server 802 providing a token 806 to a memory device 20. The server 802 has a cryptographic key 804 and token 806. The token 806 includes a list that includes pairs of logical addresses and expected digests for data for the logical addresses, in one embodiment. This list may be similar to list 450 in FIG. 4B. The token 806 is signed structure, in one embodiment. The memory device 20 also has a copy of the cryptographic key 804. In one embodiment, the cryptographic key 804 is a Replay Protected Memory Block (RPMB) key. Note that cryptographic key 804 may be a different cryptographic key than a cryptographic key that may be used to compute the digest for the data.

Connection 830 represents a connection between the server 802 and host 2. Connection 830 could have a wide variety of implementations, including but not limited to, a network (e.g., Internet) connection. Note that it is not required that the connection 830 between the server 802 and host 2 be a secure connection, in order to pass the token 806. Note that in FIG. 8, the token 806 is passed from the server 802 to the memory device 20 with the host 2 acting only as a conduit. Note that the host 2 does not have a copy of the cryptographic key 804. Thus, the host 2 cannot tamper with, or even observe, the list 450.

FIG. 9 is a flowchart of one embodiment of a process 900 a memory device 20 verifying the token 806 that contains list of pairs of logical addresses and expected digests for the logical address. The process 900 will be discussed with reference to FIG. 8. In step 902, the memory device 20 is provided with a cryptographic key 804 to verify the integrity and/or authenticity of a token 806. The memory device 20 can be provided the cryptographic key 804 at any time. For example, the cryptographic key 804 could be provided to the memory device 20 by a configuration tool when the memory device 20 is manufactured. The cryptographic key 804 might instead be provided to the memory device by the server 802.

Step 904 includes the server 802 signing the list 450 with the cryptographic key 804 to generate the token 806. In one embodiment, the server 802 signs the list 450 with an RPMB key. Note that the server 802 may also create the list of expected digest/logical address pairs. To do so, the server 802 may use the same digest computation algorithm that was provided to the memory device 20 to compute a digest for the data that is going to be (or is already) stored on the memory device 20. Also note that if the server 802 uses a cryptographic key to compute the digest, this may be a different cryptographic key than cryptographic key. Also note that the memory device 20 has a copy of the cryptographic key that the server 802 uses to compute the digest, in one embodiment.

Note that the server 802 may also have a copy of the data to be stored on the memory device 20. In a separate process, the server 802 may provide the data to the host 2, such that the host 2 may instruct the memory device to store the data at an appropriate logical address(es). In one embodiment, the server 802 is provided with the logical addresses at which the data will be (or already was) stored on the memory device 20. As one example, if the data is boot data, then the ROM 8 in the host 2 may contain the logical addresses at which the boot data is to be accessed from the memory device 20. These logical addresses can be provided to the server 802 in a variety of manners. In one embodiment, the host 2 provides the server 802 with the logical addresses at which it instructed the memory device 20 to store the data. For example, after the host instructs the memory device 20 to store data at some LBAs, the host could provide the LBAs to the server 802.

Step 906 includes the server 802 providing the signed token 806 to the memory device 20. Step 906 may include the server 802 providing the signed token 806 to host 2 over connection 830 and the host 2 providing the signed token 806 to memory device 20 over host connection 30. Note that the host 2 does not have the cryptographic key 804. Hence, the host is unable to tamper with the list 450. Also, the host is unable to even observe details of the list 450.

Step 908 includes the memory device 20 verifying the integrity and authenticity of the signed token 806. The memory device 20 may use its version of the cryptographic key 804 to verify the integrity and authenticity of the signed token 806. Assuming that the integrity and authenticity of the token 806 is verified, the memory device 20 may save the list 450 and store the list for future use.

Process 900 describes one technique of a trusted entity providing the list 450 to the memory device 20 over a secure channel. The list 450 can be provided to the memory device 20 by any type of secure channel.

Figure 10:
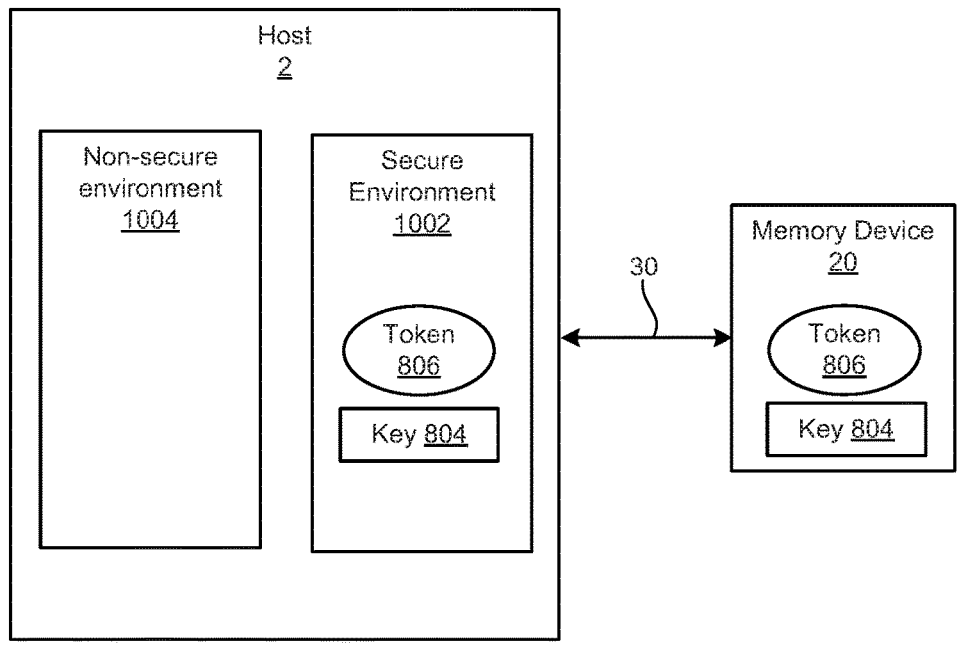
FIG. 10 is a diagram of a host providing a token to a memory device.

FIG. 10 is a diagram of a host 2 providing a token 806 to a memory device 20. The host is divided into a Secure Environment (SE) 1002 and a non-secure environment 1004, in this embodiment. In some embodiments, the SE includes a Trusted Execution Environment (TEE). An example that may implement all or a portion of the SE 1002 is TrustZone® secure integrated circuits, secure microprocessors, and secure microprocessor cores, all integrated with secure software. The SE 1002 has a cryptographic key 804 and token 806. The token 806 includes a list that includes pairs of logical addresses and expected digests for data for the logical addresses, in one embodiment. This list may be similar to list 450 in FIG. 4B. The token 806 is signed structure, in one embodiment. The memory device 20 also has a copy of the cryptographic key 804. In one embodiment, the cryptographic key 804 is a Replay Protected Memory Block (RPMB) key. Note that cryptographic key 804 may be a different cryptographic key than a cryptographic key that may be used to compute the digest for the data.

Figure 11:
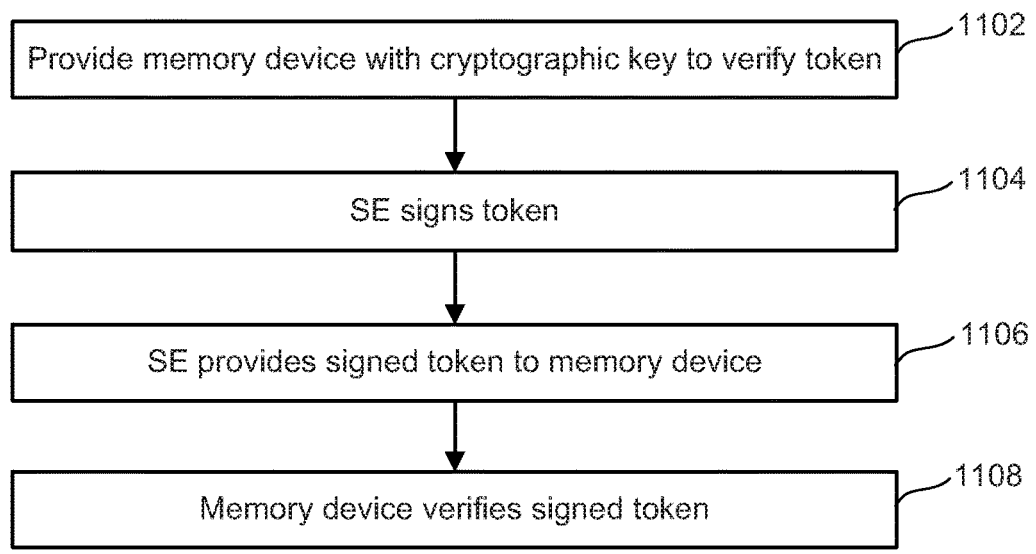
FIG. 11 is a flowchart of one embodiment of a process a memory device verifying a token from a secure environment on a host.

FIG. 11 is a flowchart of one embodiment of a process 1100 a memory device 20 verifying the token 806 that contains list of pairs of logical addresses and expected digests for the logical address. The process 1100 will be discussed with reference to FIG. 10. In step 1102, the memory device 20 is provided with a cryptographic key 804 to verify the integrity and/or authenticity of a token 806. The memory device 20 can be provided the cryptographic key 804 at any time. For example, the cryptographic key 804 could be provided to the memory device 20 by a configuration tool when the memory device 20 is manufactured. The cryptographic key 804 might instead be provided to the memory device by the SE 1002.

Step 1104 includes the SE 1002 signing the list 450 with the cryptographic key 804 to generate the token 806. In one embodiment, the SE 1002 signs the list 450 with an RPMB key. Note that the SE 1002 may also create the list of expected digest/logical address pairs. To do so, the SE 1002 may use the same digest computation algorithm that was provided to the memory device 20 to compute a digest for the data that is going to be (or is already) stored on the memory device 20. Also note that if the SE 1002 uses a cryptographic key to compute the digest, this may be a different cryptographic key than cryptographic key. Also note that the memory device 20 has a copy of the cryptographic key that the SE 1002 uses to compute the digest, in one embodiment.

Step 1106 includes the SE 1002 providing the signed token 806 to the memory device 20. Note that the non-secure environment 1004 does not have the cryptographic key 804. Hence, the non-secure environment 1004 is unable to tamper with the list 450.

Step 1008 includes the memory device 20 verifying the integrity and authenticity of the signed token 806. The memory device 20 may use its version of the cryptographic key 804 to verify the integrity and authenticity of the signed token 806. Assuming that the integrity and authenticity of the token 806 is verified, the memory device 20 may save the list 450 and store the list for future use.

Process 1100 describes a technique of a trusted entity providing the list 450 to the memory device 20 over a secure channel. The list 450 can be provided to the memory device 20 by any type of secure channel.

FIG. 12 is a flowchart of one embodiment of a process 1200 of a memory device 20 providing a secure boot as a service to a host 2. Process 1200 is implemented by the host and memory device in FIG. 1A, in one embodiment. Process 1200 is implemented by the host and memory device in FIG. 1B, in one embodiment. Prior to process 1200, process 700 may be performed to provide the memory device 20 with boot data and expected digests for the boot data. Process 900 or process 1100 could be performed to provide the memory device 20 with a list 450 of expected digests for the boot data. Note that the memory device 20 can be provided with the boot data and expected digests for the boot data at either time of manufacture or in the field.

Step 1202 includes the host boot process starting. When host 2 is turned on or restarted (or is otherwise restarting the boot process), host controller 6 may access code in ROM 8 to start the boot process.

Step 1204 includes the host controller 6 requesting boot data from the memory device 20. In one embodiment, the code from the ROM 8 instructs the host controller 6 to read the boot data from the memory device 20. In one embodiment, the host requests data from one or more logical addresses (e.g., LBAs).

Step 1206 includes the memory device 20 verifying the boot data. The boot data may be verified for data integrity and/or data authenticity. In one embodiment, the memory device 20 verifies that the host trusts the boot data. Process 600 may be used to verify the boot data.

Step 1208 is a conditional of whether the boot data was verified. If the boot data was successfully verified, then the memory device 20 provides the boot data to the host controller 6 in step 1210. Step 1210 may include the data trust manager 236 providing the boot data on the host interface 220. The boot data may pass over host connection 30 to the host controller 6.

Step 1212 includes the host booting using the boot data. The boot data, which may include code as well as reference information (e.g., fields, integers, floating point numbers, characters, words, pointers, etc.), may be used by the host to boot.

Step 1214 is performed in the event that the boot data was not successfully verified (i.e., in response to step 1208=no). Step 1214 may include the memory device 20 providing an alternative version of boot data to the host, which the memory device 20 can determine to be verified. Step 1214 might include the memory device 20 providing some sort of error message to the host to indicate that the boot data could not be verified.

A first embodiment includes an apparatus, comprising non-volatile memory; a host interface; and a control circuit in communication with the non-volatile memory and the host interface. The control circuit configured to: access data stored in the non-volatile memory in response to a request on the host interface for data for a logical address; compute a digest of the accessed data; and provide the accessed data on the host interface only if the computed digest matches an expected digest for data for the logical address.

In a second embodiment, in accordance with the first embodiment, the control circuit is further configured to verify integrity of the accessed data based on whether the computed digest matches the expected digest for data for the logical address. The control circuit is further configured to only provide the accessed data on the host interface if the integrity of the accessed data is verified.

In a third embodiment, in accordance with the first or second embodiments, the control circuit is further configured to verify authenticity of the accessed data based on whether the computed digest matches the expected digest. The control circuit is further configured to only provide the accessed data on the host interface if the authenticity of the accessed data is verified.

In a fourth embodiment, in accordance with the first to third embodiments, the non-volatile memory and the control circuit reside within a memory device. The host interface is connected to a host connection to the memory device.

In a fifth embodiment, in accordance with the fourth embodiment, the control circuit is further configured to access the expected digest for data for the logical address from a list of expected digests for logical addresses. The list is stored on the memory device.

In a sixth embodiment, in accordance with the fourth or fifth embodiments, the expected digest for data for the logical address is provided to the memory device from a host via the host connection. The control circuit is further configured to verify the expected digest based on a shared secret between the memory device and a trusted entity.

In a seventh embodiment, in accordance with the fourth through sixth embodiments, the apparatus further comprises a host controller connected to the host connection. The host controller is configured to request the data over the host connection.

In an eighth embodiment, in accordance with the seventh embodiment, the host controller is further configured to request the data over the host connection responsive to a host boot up sequence.

One embodiment includes a method comprising: receiving a request from a host on a host interface of a non-volatile memory device to read data for a host logical address; accessing the data for the host logical address from the non-volatile memory device; determining whether the accessed data is trusted by the host based on information that is stored on the non-volatile memory device; and providing the data on the host interface to the host only upon a condition that the data is trusted by the host.

One embodiment includes a non-volatile memory device, comprising non-volatile memory, and host interface means for communicating with a host that is external to the non-volatile memory device. The host interface means further for receiving a request from the host to read data that is stored in the non-volatile memory for a host logical address. The non-volatile memory device further comprises memory interface means for accessing the data for the host logical address from the non-volatile memory. The non-volatile memory device further comprises data integrity and authenticity verification means for determining integrity and authenticity of the accessed data based on information that is stored on the non-volatile memory device. The non-volatile memory device further comprises data transfer control means for transferring the accessed data to the host only upon verifying integrity and authenticity of the accessed data.

In one embodiment, the host interface means comprises one or more of host interface 220, logic 222A, PHY 220B, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, the memory interface means comprises one or more of back end module 210, sequencer 226, memory interface 230, flash control layer 232, ECC 224, RAID 228, lines 118, state machine 112, decoders 114, 124, 132, power control 116, read/write circuits 128, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, data integrity and authenticity verification means comprises one or more of data trust manager 236, digest computer 402, digest matching logic, data transfer controller 406, token verification logic, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, the data transfer control means comprises one or more of data transfer controller 406, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, a non-volatile memory device comprising non-volatile memory, host interface means, memory interface means, data integrity and authenticity verification means, and data transfer control means further comprises: host boot means for initiating a host boot up sequence; and boot data request means for requesting that host boot data be transformed to the host responsive to the host boot up sequence being initiated.

In one embodiment, the host boot means comprises one or more of host logic 4, host controller 6, ROM 8, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

In one embodiment, the boot data request means comprises one or more of host logic 4, host controller 6, ROM 8, a packaged functional hardware unit, program code (e.g., software or firmware) executable by a (micro) processor or processing circuitry, an application specific integrated circuit (ASIC), a Field Programmable Gate Array (FPGA), an electrical circuit, a digital logic circuit, an analog circuit, a combination of discrete circuits, gates, or any other type of hardware or combination thereof.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
   non-volatile memory;
   a host interface; and
   a control circuit in communication with the non-volatile memory and the host interface, the control circuit configured to:
   access data stored in the non-volatile memory in response to a request on the host interface for data for a logical address;
   access a stored list of expected digests for data associated with logical addresses, wherein the list contains an expected digest for data associated with each logical address on the list;
   compute a digest of the accessed data for the logical address; and
   provide the accessed data on the host interface only if the computed digest matches the expected digest for data associated with the logical address.

2. The apparatus of claim 1, wherein the control circuit is further configured to:
   verify integrity of the accessed data based on whether the computed digest matches the expected digest; and
   provide the accessed data on the host interface only if the integrity of the accessed data is verified.

3. The apparatus of claim 2, wherein the control circuit is further configured to:
   verify authenticity of the accessed data based on whether the computed digest matches the expected digest; and
   provide the accessed data on the host interface only if the authenticity of the accessed data is verified.

4. The apparatus of claim 1, wherein the control circuit is further configured to:
   verify authenticity of the accessed data based on whether the computed digest matches the expected digest; and
   provide the accessed data on the host interface only if the authenticity of the accessed data is verified.

5. The apparatus of claim 1, wherein:
   the non-volatile memory and the control circuit reside within a memory device; and the host interface is connected to a host connection to the memory device.

6. The apparatus of claim 5, wherein:
   the list is stored on the memory device.

7. The apparatus of claim 5, wherein:
   the expected digest for data for the logical address is provided to the memory device from a host via the host connection; and the control circuit is configured to verify the expected digest based on a shared secret between the memory device and a trusted entity.

8. The apparatus of claim 5, further comprising a host controller connected to the host connection and configured to request the data over the host connection.

9. The apparatus of claim 8, wherein the host controller is configured to request the data over the host connection responsive to a host boot up sequence.

10. A method comprising:
receiving a request from a host on a host interface of a non-volatile memory device to read data for a host logical address;
accessing the data for the host logical address from the non-volatile memory device;
computing a digest for the accessed data for the host logical address;
accessing a list that is stored on the non-volatile memory device, the list contains host logical addresses and an expected digest for each host logical address on the list;
determining whether the computed digest matches the expected digest for the host logical address; and
providing the data for the host logical address on the host interface to the host only upon a condition that the computed digest for the host logical address matches the expected digest for the host logical address.

11. The method of claim 10, further comprising:
storing, on the non-volatile memory device, the list of host logical addresses with the expected digest for data associated with each host logical address.

12. The method of claim 11, further comprising:
receiving, at the non-volatile memory device, a signed token comprising the list; and
verifying the signed token as a condition to use the list to determine whether data stored at the host logical addresses on the list is trusted by the host.

13. The method of claim 11, further comprising:
receiving the list over a secure channel between the non-volatile memory device and a trusted entity, wherein the list is received from the host over the host interface.

14. The method of claim 11, further comprising:
receiving, at the host, the list from a server;
receiving the list at the non-volatile memory device from the host over the host interface; and
verifying the list, by the non-volatile memory device, based on a shared secret between the server and the non-volatile memory device that is not shared with the host.

15. The method of claim 11, further comprising:
receiving the list at the non-volatile memory device from a secure environment (SE) on the host over the host interface; and
verifying the list, by the non-volatile memory device, based on a shared secret between the SE on the host and the non-volatile memory device.

16. The method of claim 10, further comprising:
initiating, by the host, the request for the data for the host logical address in response to a host boot up sequence to load a program into the host.

17. A non-volatile memory device, comprising:
non-volatile memory;
host interface means for communicating with a host that is external to the non-volatile memory device, the host interface means further for receiving a request from the host to read data that is stored in the non-volatile memory for a host logical address;
memory interface means for accessing the data for the host logical address from the non-volatile memory;
digest computation means for computing a digest of the data for the host logical address;
digest matching means for determining whether the computed digest of the data for the host logical address matches an expected digest of the data for the host logical address, wherein the non-volatile memory device stores the expected digest of data for each host logical address on a list;
data integrity and authenticity verification means for determining integrity and authenticity of the accessed data based on whether the computed digest matches the expected digest for the host logical address; and
data transfer control means for transferring the accessed data to the host only upon verifying integrity and authenticity of the accessed data.

18. The non-volatile memory device of claim 17, further comprising:
host boot means for initiating a host boot up sequence; and
boot data request means for requesting that host boot data be transferred to the host responsive to the host boot up sequence being initiated;
wherein the data integrity and authenticity verification means is further for providing trusted boot data.

\* \* \* \* \*